Patented Oct. 14, 1952

2,614,091

UNITED STATES PATENT OFFICE 2,614,091

FRICTION ELEMENTS FROM THE REACTION PRODUCT OF MELAMINE, FORMALDEHYDE AND TOLUENE SULFONAMIDE

Edmund S. Bauer, Jr., Springfield, Mass., assignor to Monsanto Chemical Company, St. Louis, Mo., a corporation of Delaware No Drawing. Application May 26, 1948, Serial No. 29,409

1 Claim. (Cl. 260—39)

This invention relates to friction elements. More particularly, the invention relates to resin bonded friction elements such as are employed in automobile brakes, clutches and the like.

Resin bonded friction elements have been used for some time as brake linings, brake blocks, clutch facings for automobiles, trucks, tractors, etc. The friction elements and the resin bonds used therein must meet a set of conditions which are peculiar to friction elements and which are not met elsewhere. For example, the material must have high heat resistance to resist the frictional heat developed. The surface of the elements must not wear smooth as that would change the friction characteristics during use. In addition to high initial friction, the elements must have good fade and recovery properties, they must not cause squeaking or chatter and they must not affect the feel of the foot pedal used to actuate them. No friction element hitherto produced has adequately met all of the above requirements.

It is an object of this invention to provide improved friction elements.

A further object is to provide resin bonded friction elements which have high heat resistance, good fade and recovery characteristics and do not cause squeaking or chatter.

These and other objects are attained by bonding inorganic mineral fillers with aminotriazine resins which have been modified by reaction with aryl sulfonamides.

Example I

A clutch facing tape woven from cotton and asbestos fibers and containing about 65% asbestos was dipped in an ethanol-water solution of the co-condensation product of melamine, toluenesulfonamide and formaldehyde as hereinafter described. The tape was withdrawn slowly from the solution, air dried at room temperature for 24 hours, baked for one hour at 150° F. and then placed between shaping tins and baked further for one hour at 350° F., followed by one hour at 375° F. and two hours at 400° F. The resultant clutch facing was firm and exhibited excellent wear and friction qualities.

The wear and friction qualities were tested by the following methods which are standard in the industry. A 10″ x 7″ x ⅛″ clutch facing is subjected to a 750 lb. pressure plate using a 90 second engagement. This test measures the fade qualities in terms of foot pounds of torque. A clutch facing made as shown in Example I when subjected to this test showed a torque of 130 ft. lbs. which built up to 140 ft. lbs. during the test and was still 130 ft. lbs. at the end of the test. Thus, the facing showed no fading during the test but rather a slight increase in torque. A standard, oil-modified phenolic resin bonded facing fades rapidly to less than 100 ft. lbs. of torque in this test.

Using the same testing equipment but repeating the engagements many times, the wearing qualities of the facings are determined. A facing made as shown in Example I showed a loss of less than 10 grams after 650 engagements whereas standard facings lost from 12 to 20 grams in the same test.

Example II

A clutch facing blank made from asbestos mill board was dipped in a 50% solids ethanol-water solution of the co-condensation product of melamine, toluene-sulfonamide and formaldehyde, air dried and cured as shown in Example I. The wear and fade resistance of the resultant facing was similar to that obtained with the woven asbestos-cotton tape.

Example III

A mixture of 75 parts by weight of asbestos fiber and 25 parts of the co-condensation product of melamine, toluenesulfonamide, and formaldehyde (in a 50% solids solution in a xylolbutanol mixture) was prepared by dry-mixing in a dough mixer. The mixture was extruded hot onto a conventional wire backing and cured thereon at 350 to 400° F. to produce a wire-backed clutch facing. The resultant facing had equally good fade resistance as the facings made according to the previous examples and showed even less wear under repeated engagements of the 750 lb. pressure plate.

Sample facings made according to each of the examples were mounted on conventional automotive clutches and subjected to extensive road tests. Particularly good results were obtained with the facings made according to Examples I and II. There was no evidence of squeaking nor of breakdown due to frictional heat developed by repeated use of the clutch. Furthermore, the clutches gave positive and firm engagements throughout the road tests.

The resins which are used as binders according to this invention are prepared by reacting an aldehyde-reactable aminotriazine with an aromatic sulmonamide and an aldehyde under alkaline conditions to obtain a liquid resin which may be cured by heating at elevated temperatures. Thus, 1 mol of aminotriazine may be reacted with 0.5 mol of aromatic sulfonamide at a pH of 8–9 under refluxing conditions at atmospheric pressure. The resulting resins may be cured at temperatures from 50 to 400° C. The resins may be used without dilution or they may be dissolved in mixtures of water with lower aliphatic alcohols, or in mixtures of aromatic hydrocarbons with lower aliphatic alcohols.

Melamine is the preferred aminotriazine but it may be replaced in whole or in part by other aldehyde-reactable aminotriazines and their deamination products including ammeline, melam, melem, 2,4,6-trialkyl-1,3,5-triaminotriazines such as 2,4,6-triethyl-1,3,5-triaminotriazine, 2,4,6-triaryl-1,3,5-triaminotriazines such as 2,4,6-triphenyl-1,3,5-triaminotriazine, etc.

The aromatic sulfonamides which may be used are benzene sulfonamide and the ring-substituted derivatives thereof such as the toluene sulfonamides, chlorobenzene sulfonamides, nitrobenzene sulfonamides, etc.

The aldehydes which may be used are aliphatic, aromatic, cyclic, and heterocyclic aldehydes including formaldehyde, acetaldehyde, propionaldehyde, butyraldehyde, isobutyraldehyde, valeraldehyde, octaldehyde, benzaldehyde, cinnamaldehyde, cyclohexanone, furfural, etc.

For reasons of economy and availability, it is preferred to use the co-condensation products of melamine, toluene-sulfonamide and formaldehyde. The proportions of reactants may be varied between the limits of 1 mol of melamine to from 0.1 to 1.0 mol of toluene-sulfonamide and from 1 to 6 or more mols of formaldehyde. An excess of the formaldehyde may be used. The toluene-sulfonamides may be any of the isomeric ortho, meta or para derivatives or it may be a mixture of two or more of the isomers.

The amount of resin used depends somewhat on the type of friction facing being prepared but it has been found that a resin pickup of between 20 and 30% by weight of the dry filler is optimum.

Any of the friction fillers commonly used may be bonded with the resins of this invention and any of the standard processes used in the industry may be employed. The best of the friction materials are prepared wholly or in part from mineral fibers which are resistant to heat and especially asbestos fibers although glass fibers and fibers produced from inorganic materials by synthetic processes may also be used. The fibers may be formed into a web or sheet by conventional methods prior to impregnation with the resin binder or they may be mixed with the resin and then extruded into the desired form either onto a wire backing or onto a plane surface to give an unreinforced element.

Friction elements made according to this invention meet all of the requirements for such elements. They are highly resistant to heat developed by friction, they show little or no fade during use and therefore eliminate many of the considerations involving recovery after fade, they lose relatively little of their mass during actual wearing conditions and they do not cause squeaking or alteration of pedal feel.

It is obvious that many variations may be made in the products and processes of this invention without departing from the spirit and scope thereof as defined in the appended claim.

What is claimed is:

A molded friction facing element comprising mineral fibers bonded with a completely cured bonding material capable of plastic flow prior to curing, said bonding material comprising an internally plasticized condensation product of 1 mol of melamine, with from 1–6 mols of formaldehyde, said internal plasticization having been obtained by co-condensing 0.5 mol of toluene sulfonamide with said melamine and said formaldehyde.

EDMUND S. BAUER, Jr.

REFERENCES CITED

The following references are of record in the file of this patent:

UNITED STATES PATENTS

| Number | Name | Date |
|---|---|---|
| 2,080,314 | Hoof | May 11, 1937 |
| 2,197,357 | Widmer et al. | Apr. 16, 1940 |
| 2,320,817 | D'Alelio | June 1, 1943 |
| 2,430,708 | D'Alelio | Nov. 11, 1947 |
| 2,448,338 | Widmer et al. | Aug. 21, 1948 |

FOREIGN PATENTS

| Number | Country | Date |
|---|---|---|
| 412,373 | Canada | May 11, 1943 |